United States Patent
Reminder

(10) Patent No.: US 12,012,284 B2
(45) Date of Patent: Jun. 18, 2024

(54) STORAGE SHELF UNIT FOR STORING AT LEAST ONE STORED GOODS CARRIER AND METHOD FOR RECORDING A STOCK OF A STORAGE SHELF UNIT

(71) Applicant: Hanel & Co., Altstatten (CH)

(72) Inventor: Manfred Reminder, Ingelfingen (DE)

(73) Assignee: Hanel & Co., Alstatten (CH)

( * ) Notice: Subject to any disclaimer, the term of this patent is extended or adjusted under 35 U.S.C. 154(b) by 663 days.

(21) Appl. No.: 17/283,444

(22) PCT Filed: Jul. 1, 2020

(86) PCT No.: PCT/EP2020/068538
§ 371 (c)(1),
(2) Date: Apr. 7, 2021

(87) PCT Pub. No.: WO2021/001432
PCT Pub. Date: Jan. 7, 2021

(65) Prior Publication Data
US 2021/0339954 A1    Nov. 4, 2021

(30) Foreign Application Priority Data
Jul. 4, 2019 (DE) .................. 10 2019 118 046.5

(51) Int. Cl.
*G06F 7/00* (2006.01)
*B65G 1/137* (2006.01)

(52) U.S. Cl.
CPC ........ *B65G 1/137* (2013.01); *B65G 2203/041* (2013.01)

(58) Field of Classification Search
CPC . B65G 1/137; B65G 2203/041; G06Q 10/087
USPC ................................. 700/213–214, 216, 218
See application file for complete search history.

(56) References Cited

U.S. PATENT DOCUMENTS 9,505,554 B1 * 11/2016 Kong ..................... G06V 10/25

FOREIGN PATENT DOCUMENTS

| DE | 10 2007 004 866 A1 | 8/2008 |
| DE | 10 2008 018 436 A1 | 10/2009 |
| DE | 10 2008 027 646 A1 | 12/2009 |
| WO | 2008 029 159 A1 | 9/2007 |

* cited by examiner

*Primary Examiner* — Yolanda R Cumbess
(74) *Attorney, Agent, or Firm* — Harter Secrest & Emery LLP; Timothy W. Menasco, Esq.

(57) ABSTRACT

The invention relates to a storage shelf unit (10) with a plurality of carrier supports (12) disposed one above the other for supporting stored goods carriers (20) that can be transported by means of an automatic transport device (14), with at least one loading and retrieval opening (16) for delivering and retrieving the stored goods carrier (20). An image recording unit (40) is disposed at an upper side (18) of the loading and retrieval opening (16) for this purpose. The image recording unit (40) is attached to a moving device (30) that can be moved in a horizontal direction (X).

13 Claims, 3 Drawing Sheets

STORAGE SHELF UNIT FOR STORING AT LEAST ONE STORED GOODS CARRIER AND METHOD FOR RECORDING A STOCK OF A STORAGE SHELF UNIT

The invention relates to a storage shelf unit with a plurality of carrier supports disposed one above the other for supporting stored goods carriers that can be transported by an automatic transport device, with at least one loading and retrieval opening for delivering and retrieving the stored goods carrier, wherein an image recording unit is disposed at an upper side of the loading and retrieval opening. The invention further relates to a method for recording a stock of a storage shelf unit.

A storage shelf unit of the type mentioned in the introduction is known from DE 10 2008 018 436 A1. In such storage shelf units, a stored goods carrier, for the loading and retrieval of stored goods, is automatically moved by a transport device from one of the storage locations to the loading and retrieval opening. The warehouse clerk can then deposit the stored goods to be put in storage on the stored goods carrier. The warehouse clerk can then manually record in a system the storage location and further information regarding the stored goods. Finally the stored goods carrier with the stored goods is automatically moved by the transport device to a storage location and stored there until retrieved. An image recording unit for taking an image of the stored goods carrier is disposed at the upper side of the loading and retrieval opening. Particularly in the case of stored goods carriers with a large surface, stored goods in the edge region of the stored goods carrier can only be recorded to a limited extent by an image recording unit mounted in this manner. Furthermore, the distance of the stored goods from the image recording unit depends on the depositing location, so that a direct comparison of the geometric dimensions of the stored goods is possible only to a limited extent.

DE 10 2007 004 866 A1 discloses a storage shelf unit with a indicating device at the upper side of the loading and retrieval opening, which indicates stored goods on a storage surface of the stored goods carrier by lighting elements.

Particularly in the case of high-rise shelfing, there is often an issue in that an exact visual recording of the stock is possible only with a great expenditure in personnel. In the process, in order to check the stock or to prepare an inventory, for example, each stored goods carrier has to be removed from storage individually and put back into storage once the stock has been recorded, such as the filling quantity of a small-parts container. Moreover, stored goods have to be recorded separately during loading and/or retrieval. The efficiency during loading and/or retrieval of stored goods is thus reduced.

The invention is based on the object of proposing a storage shelf unit in which the recording of the stock is provided by precisely recorded images of an image recording unit in a loading and retrieval opening. Further, a method for recording a stock of a storage shelf unit is proposed, which permits images to be recorded automatically and precisely while loading and/or retrieving stored goods.

In order to achieve the object, a storage shelf unit of the type mentioned in the introduction is proposed, in which the image recording unit is attached to a moving device that can be moved in a horizontal direction (X).

The storage shelf unit according to the invention is characterized in that smaller stored goods, next to larger stored goods, are recorded unobstructed from a bird's eye view because the image recording unit is positioned centrally over stored goods by the moving device. As a result, an unobstructed image of the stored goods is prepared. It is thus possible to record small stored goods deposited next to large stored goods.

Since the distance of the image recording unit from the stored goods carrier is always constant, the recorded images can be compared relative to one another, and the geometric dimensions can be automatically classified in relation to one another and determined, for example.

Advantageously, the image recording unit is oriented substantially perpendicularly to a storage surface of the stored goods carrier for taking an image. As a result, a constant angle for taking an image from the bird's eye view is ensured.

In an advantageous embodiment, the moving device can be moved in a second horizontal direction (Y). As a result, the moving device can move across the entire process area and position the image recording unit over stored goods even in deep loading and retrieval openings.

Advantageously, the moving device is disposed on rails disposed orthogonally to each other, wherein the moving device can be positioned along the rails by a motor. Moreover, it is conceivable to position the moving device also by a pulling device pulling the moving device along the rails. In an advantageous embodiment, the position of the moving device is recorded by a motion-sensing element, such as a cable sensor, a differential transformer or a controlled motor. As a result, a precise determination of the position of the moving device is possible.

Advantageously, the image recording unit has an objective lens with a fixed focus. Because of the objective lens having a fixed focus and the distance of the image recording unit from the processing area being kept constant, the geometric dimensions of the stored goods can be visually compared. For this purpose, the objective lens may also be equipped with a sensor recording the setting of the image recording unit and the position of the moving device, so that the size of the stored goods can be computed by the recorded setting, position of the moving device and distance from the processing area. Thus, the scale is known also in the case of an adjustable focus, so that stored goods can be compared with each other.

A lighting device is advantageously provided, which illuminates at least the part of the storage surface recorded by the image recording unit. As a result, regions recorded by the image recording unit can be illuminated, so that a detailed image can be taken. This is advantageous, for instance, in the case of deep containers having a low filling level. In this case, the stored goods contained therein is concealed by the walls of the container from a centrally attached lighting system, which is not the case in the arrangement of the lighting system according to the invention. As a result, high-quality images can be prepared. In one embodiment, the lighting elements may be LED's. Another advantage is that, using such a lighting device, a reliable, unobstructed display of the stored goods is possible.

In an advantageous embodiment, the image recording unit is disposed centrally on the moving device. The lighting elements of the lighting device are expediently mounted around the image recording unit. In another advantageous embodiment, they may be disposed around the image recording unit at uniform intervals from each other. Because of the lighting elements disposed around the image recording unit, a homogeneous illumination of the stored goods is possible because the lighting elements illuminate the stored goods from different angles, around the image recording unit. Thus, only minor shadow formation results.

Advantageously, the lighting device lights up a first region of the storage surface, by a red light for highlighting the first region, or by a white light for illuminating the first region. In this way, a region can be identified for the warehouse clerk which, for example, contains stored goods that are to be put in storage. In addition to the first region, a second, third, fourth or fifth region may also be provided, for example. The respective region is located on the storage surface of a stored goods carrier. By lighting up a region, for instance, stored goods may either, by a white light, be made easier to identify for a warehouse clerk, or a depositing location may be indicated to the warehouse clerk by a red light.

Advantageously, the storage shelf unit comprises an image evaluation device, which combines into a complete image images of several regions, which include at least a first region and a second region, that were taken from different positions of the moving device by the image recording unit.

This is advantageous in that a complete image of a stored goods carrier is produced that is composed of several regions each showing images of stored goods from a bird's eye view. A precise, unobstructed depiction of the entire stored goods carrier is thus possible. It is also conceivable that larger stored goods can be prepared by several recorded images combined by the image evaluation device. Moreover, the image evaluation device is also capable of coupling the recorded data from the image recording unit and the moving device with the recorded image, so that detailed information regarding the position, size and other information can be stored.

For example, a complete image of the stored goods carrier can be shown to the warehouse clerk by a display. In this way, the region at which the stored goods to be retrieved are located can be indicated to the warehouse clerk by the image, for instance. Furthermore, the images of the stored goods can be updated as soon as a loading or retrieval process has been carried out, without a new complete image of the stored goods carrier having to be prepared in the process. Thus, a current image of the stored goods carrier is always stored.

Furthermore, a method for recording a stock of a storage shelf unit of a storage shelf unit of the type mentioned above, is proposed in order to achieve the object. The method includes the following steps:
a. positioning a stored goods carrier in a loading and/or retrieval opening of a storage shelf unit;
b. moving an image recording unit over a region of the stored goods carrier into which stored goods are placed or from which they are retrieved;
c. taking an image of the region;
d. storing, processing and evaluating the image.

It is possible by the method to record stored goods located on a stored goods carrier from a bird's eye view. Also, a current image of the stored goods put in storage is always stored. What is particularly advantageous in this case is that this information can be accessed via a central image evaluation device in conjunction with an intelligent warehouse management software with an integrated database in which the recorded data are stored.

Advantageously, the image recording unit records images by an unvarying focus and/or an unvarying orientation. As a result, images can be taken which are comparable in size to the images already taken previously. Thus stored goods can be compared with respect to size by the images.

In another advantageous embodiment, the size of the recorded stored goods is computed. As a result, the image recording unit may also include an objective lens with a variable focus. A sensor may be provided on the objective lens for the computation, or a reference point may be pictured on the depositing surface, so that the number of pixels, or image points of a digital image, along an extent determined by the defined size of the reference point is thus defined.

Advantageously, the image evaluation device crops the recorded image of the region in such a way that at least one depositing region is pictured. As a result, images of the depositing regions can be juxtaposed without parts of the recorded regions overlapping.

Advantageously, the image evaluation device prepares a complete image of the stored goods carrier by a plurality of pictures of the depositing regions. Using the above-described method, it is possible to prepare a current complete image of the stored goods carrier, so that a current image of the stock is always stored in the memory unit included in the image evaluation device. In order to simplify the localization of a storage location and the depiction in the case of storage processes, the individual images of the recorded stored goods are always framed in a "rectangle". As a result, the current stock on the stored goods carrier can be displayed in advance to the warehouse clerk via a screen coupled to a warehouse management software.

Advantageously, a free depositing region on the stored goods carrier is visually marked in the complete image of the stored goods carrier. This provides the advantage that the region to which the stored goods have to be transported in order to deposit them is shown to the warehouse clerk in a comprehensible and simple manner. The regions that are already occupied, or the regions that are unoccupied, are also clearly shown to the warehouse clerk. Such a marking can be implemented by a hatched area, but also by a colored, transparent surface placed over the image. Moreover, it would be conceivable to implement this marking by changing the brightness of the region, but also by providing the edge of the region with a frame that permits marking or highlighting.

Advantageously, stored goods in the depositing region are identified by image recognition and information on the stored goods is displayed on a display unit. The image recognition permits an automatic recording of the stored goods; as a result, information and descriptions in a system can be connected to the prepared image and stored. For example, the information may include the number of stored goods in this depositing region, a filling level of a small-parts container, particularly of a box containing screws, but also information on an engine block, such as the size, circumference or other features, such as the type number or serial number.

Advantageously, inventory records are automatically prepared or updated subsequent to the loading and/or retrieval of stored goods. This yields the advantage that the inventory records always include the current stock. Such a process may also take place in an automated manner, and stock can thus be checked regularly. In addition, it is possible by image recognition to find wrongly deposited or non-entered stored goods. In the process, each stored goods carrier is moved into the retrieval opening manually or in an automated manner in order to take a complete image of the stored goods carrier. This image is compared with the information already stored. In the event of any deviations, an inventory assignment (counting proposal) may be prepared for the respective stored goods carrier. Expediently, an inventory is taken in a period in which no loading and/or retrieval takes place or is to be expected, particularly after the end of business hours.

A storage shelf unit which is schematically shown in the attached drawings will be explained in more detail below. In the Figures.

Figure 1:
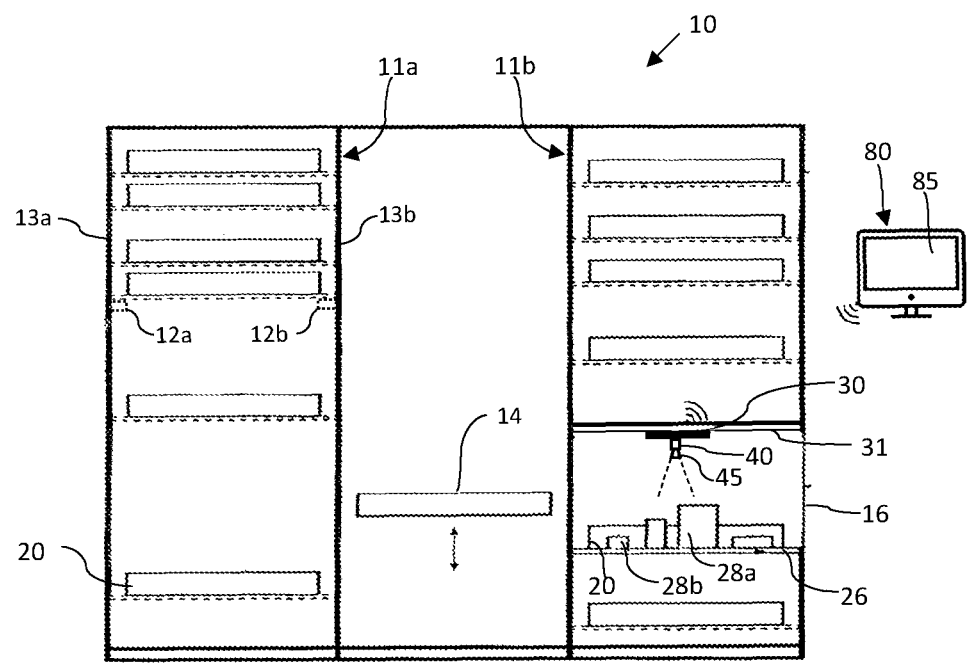
FIG. 1 shows an illustration of a storage shelf unit according to the invention.

The storage shelf unit 10 for storing a plurality of stored goods carriers 20 shown in FIG. 1 includes two spaced-apart modules 11a, 11b. The modules 11a, 11b have a plurality of spaced-apart carrier supports 12a, 12b, which are arranged in pairs and on opposite side walls 13a, 13b. The carrier supports 12a, 12b serve for supporting trough-shaped stored goods carriers 20 in which the goods 28 are accommodated. Thus, the carrier supports 12a, 12b form a plurality of storage locations for supporting the stored goods carriers 20.

The goods 28 are located on a depositing region 26 of a storage surface 25 of the stored goods carrier 20. Goods 28 may include containers for small-parts, such as a plurality of screws, for example, but also individual parts, such as engine parts. Large goods 28a protrudes from the stored goods carrier 20 to a greater height than small goods 28b.

A transport device 14, which automatically moves the stored goods carrier 20 between the loading and retrieval opening 16 and a storage location in the modules 11a, 11b, is disposed between the modules 11a, 11b. For example, the storage shelf unit 10 may also include a second loading and/or retrieval opening 16, which is not depicted in FIG. 1.

An image evaluation device 80 and a display 85 are assigned to the storage shelf unit 10.

A stored goods carrier 20 can be positioned in the loading and/or retrieval opening 16. Goods 28 can be deposited on the stored goods carrier 20 or retrieved therefrom. An image recording unit 40 for recording the goods 28 deposited on the stored goods carrier 20 is disposed at an upper side 18 of the loading and retrieval opening 16. The image recording unit 40 is attached to a moving device 30.

Figure 2:
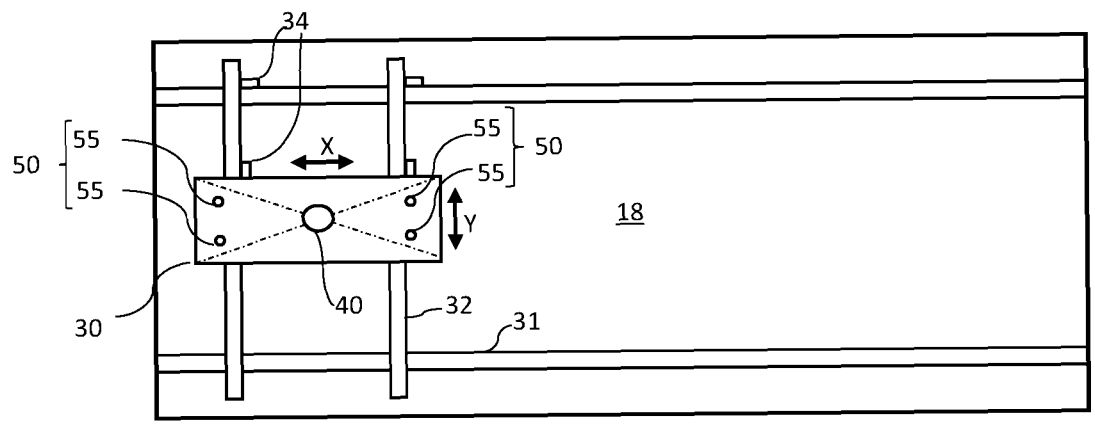
FIG. 2 shows a moving device disposed at an upper side of the loading and retrieval opening of the storage shelf unit.

The moving device 30 mounted on two rails 31, 32 disposed orthogonally to each other, as is shown in FIG. 2. The rails 31, 32 are disposed at the upper side 18 of the loading and retrieval opening 16. The moving unit 30 can be moved along the first horizontal direction X via rails 31, and along the second horizontal direction Y via rails 32 of the loading and/or retrieval opening 16, so that the entire stored goods carrier 20 can be recorded by the image recording unit 40. For this purpose, the moving device 30 is moved by a motor 34, for instance.

The image recording unit 40 with an objective lens 45 is centrally fixed to the moving device 30. The image recording unit 40 is oriented substantially perpendicularly towards the stored goods carrier 20. As a result, the goods 28 are recorded from a bird's eye view. Larger goods 28b thus cannot obscure small goods 28a, for example.

In the illustrated embodiment, the image recording unit 40 is not adjustable so that the orientation is unvarying. In combination with an unvarying focal setting of the objective lens 45 and a constant orientation, comparable images can thus be prepared.

Lighting elements 55 of a lighting device 50 are disposed around the image recording unit 40. In an advantageous embodiment, these lighting elements 55 are uniformly arranged around the objective lens 45 of the image recording unit 40. In this case, the lighting elements 55 are oriented towards the same region that is recorded by the image recording unit 40.

The image evaluation device 80 processes all data recorded during a loading and/or retrieval process. The image evaluation device 80 also comprises a memory unit storing the recorded data.

Furthermore, the image evaluation device 80 may be coupled to the image recording unit 40 by a wireless link.

The display 85 describes a display unit via which information regarding a loading and/or retrieval assignment can be displayed to a warehouse clerk. Information is to be understood to be a complete image of the stored goods carrier 20, entry information, material number, moved quantity, user, time and date etc. in table form.

Figure 3:
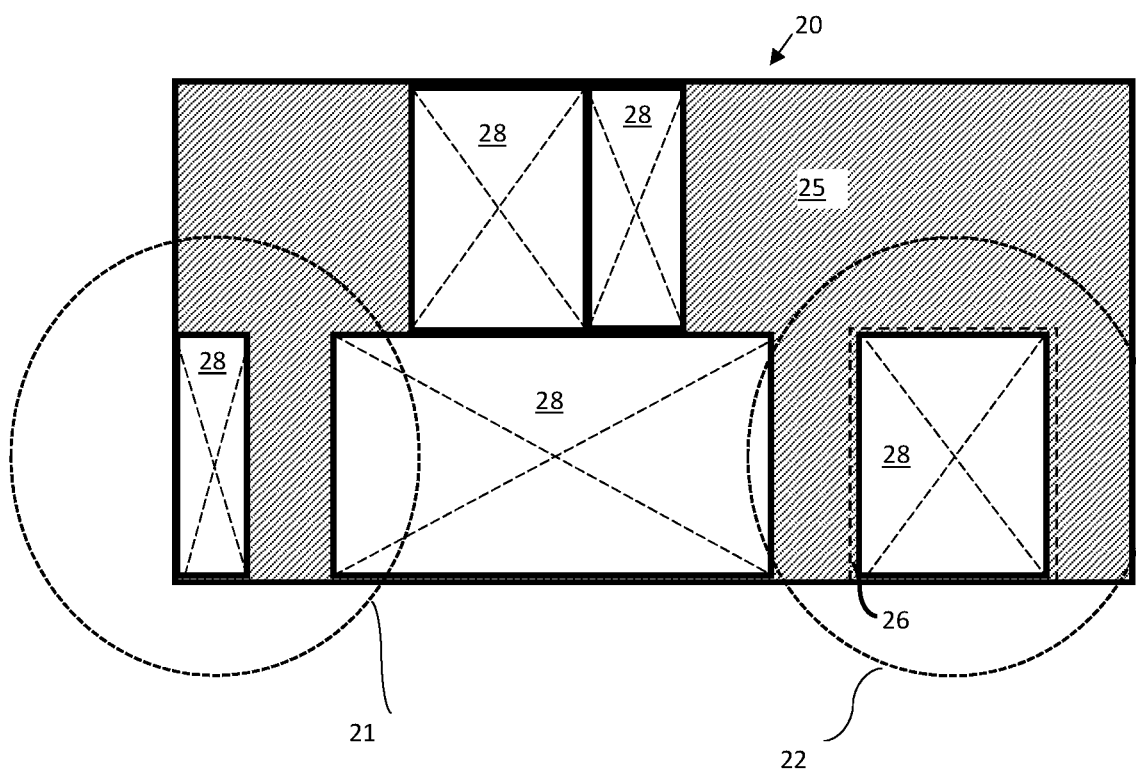
FIG. 3 shows a plan view of a stored goods carrier.

A recorded complete image of a stored goods carrier 20 is shown by way of example in FIG. 3. For this purpose, the image recording unit 40 records at least one first region 21 and/or one second region 22. A plurality of regions 21, 22 of the stored goods carrier 20 may also be recorded. Each region 21, 22 comprises at least one depositing region 26. In order to record the regions 21, 22, the image recording unit 40 is disposed centrally above the depositing region 26.

In a possible embodiment, a depositing region 26 may also be depicted by two recorded regions 21, 22 combined by the image evaluation device 80. The recorded first region 21 may be cropped by the image evaluation device 80 in such a way that only the depositing region 26, which is occupied by way of example by goods 28 in FIG. 3, is visible in the stored image.

Thus, the complete image of the stored goods carrier 20 is constituted by a plurality of depositing regions 26 that can each be renewed individually after a loading and/or retrieval operation. Also, unoccupied bearing surfaces 25 of the stored goods carrier 20 can be marked by a hatched area, as shown in FIG. 3.

Figure 4:
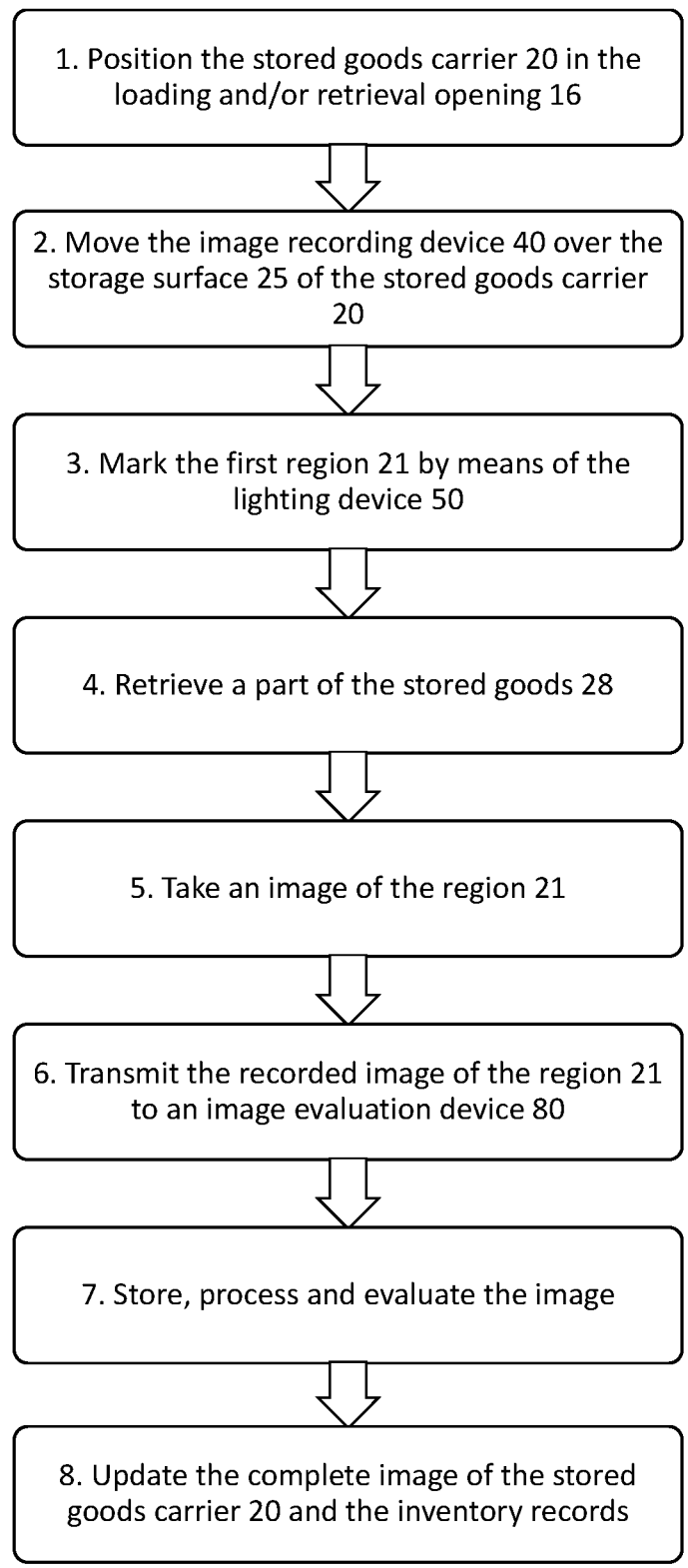
FIG. 4 shows a flow chart regarding a method of the invention for recording a stock of a storage shelf unit.

With a flow chart, FIG. 4 shows by way of example the individual method steps during a retrieval of stored goods from the above-described storage shelf unit 10.

In a first step, a stored goods carrier 20 with goods 28 to be retrieved is positioned in a loading and retrieval opening 16 after the warehouse clerk has initiated a corresponding entry for a retrieval of stocked goods 28.

In a next step, the image recording unit 40 is positioned centrally above the depositing region 26 of the stored goods carrier 20 comprising goods 28 to be retrieved.

Then, the first region 21 including the depositing region 26 with the goods 28 is marked by a lighting element 55, so that the storage location of the goods 28 in the loading and retrieval opening 16 is displayed to the warehouse clerk.

As an example, the warehouse clerk retrieves only a part of the goods 28, e.g. a screw, from a container placed on a depositing region 26 on the stored goods carrier 20.

The image recording unit 40 then takes a new image of the first region 21 including the depositing region 26 with the goods 28.

The image taken is then transmitted to an image evaluation device 80.

The image evaluation device 80 stores the image and crops the image to show the depositing region 26 in such a way that only the goods 28 are still visible. In the process, the new filling level of the container is recorded and also stored.

Finally, the recorded new information is added to inventory records, and the part of the complete image of the stored goods carrier 20 or of the storage surface 25 including the depositing region 26 is updated.

The invention is characterized in that it is possible to take an unobstructed image of the goods 28 in a simple and precise manner. Moreover, only a image recording device 40 is required.

Using such a device and/or method, an efficient storage of goods 28 can thus be provided. It is also possible to prepare inventory records in a fully automated manner, with an exact and current recording of the stock being ensured.

| List of Reference Numerals | |
| --- | --- |
| 10 | Storage shelf unit |
| 11a | Module |
| 11b | Module |
| 12a, b | Carrier supports |
| 13a, b | Side wall |
| 14 | Transport device |
| 16 | Loading and/or retrieval opening |
| 18 | Upper side |
| 20 | Stored goods carrier |
| 21 | First region |
| 22 | Second region |
| 25 | Storage surface |
| 26 | Depositing region |
| 28 | Stored goods |
| 28a | Large stored goods |
| 28b | Small stored goods |
| 30 | Moving device |
| 31 | Rail |
| 32 | Rail |
| 34 | Motor |
| 40 | Image recording unit |
| 45 | Objective lens |
| 50 | Lighting device |
| 55 | Lighting element |
| 80 | Image evaluation device |
| 85 | Display |
| X | First horizontal direction |
| Y | Second horizontal direction |

The invention claimed is:

1. A storage shelf unit comprising:
a plurality of carrier supports disposed one above the other for supporting stored goods carriers,
an automatic transport device for transporting the stored goods carriers,
at least one loading and retrieval opening for delivering and retrieving at least one of the stored goods carriers,
an image recording unit disposed at an upper side of the at least one loading and retrieval opening,
a lighting device for highlighting a region of the stored goods carrier that has been recorded by the image recording unit, and
a moving device configured to move in a first horizontal direction and a second horizontal direction, wherein the image recording unit and the lighting device are attached to the moving device.

2. The storage shelf unit according to claim 1, wherein the image recording unit is oriented substantially perpendicularly to a storage surface of the stored goods carrier for taking an image of the storage surface.

3. The storage shelf unit according to claim 1, wherein the moving device is disposed on rails disposed orthogonally to each other, wherein the moving device is configured to move along the rails by a motor.

4. The storage shelf unit according to claim 1, wherein the image recording unit has an objective lens with a fixed focus.

5. The storage shelf unit according to claim 4, wherein the lighting device illuminates the first region of the storage surface by a red light for highlighting the first region, or by a white light for illuminating the first region.

6. The storage shelf unit according to claim 1, wherein an image evaluation device, which takes the image recording unit images of several regions including at least the first region and a second region from different positions of the moving device and combines them into a complete image.

7. A method for recording a stock of a storage shelf unit, the storage shelf unit comprising:
a plurality of carrier supports disposed one above the other for supporting stored goods carriers,
an automatic transport device for transporting the stored good carriers,
at least one loading and retrieval opening for delivering and retrieving at least one of the stored goods carriers,
an image recording unit disposed at an upper side of the loading and retrieval opening,
a lighting device for highlighting a region of the stored goods carrier recorded by the image recording unit, and
a moving device that can be moved in a first horizontal direction and a second horizontal direction, wherein the image recording unit and the lighting device are attached to the moving device, the method comprising the following steps:
a. positioning a stored goods carrier in the loading and retrieval opening of the storage shelf unit;
b. moving the image recording unit and the lighting device attached to the moving device over a region of the stored goods carrier into which stored goods are placed or from which they are retrieved, the image recording unit and the lighting device move over the stored goods carrier located in the loading or retrieval opening;
c. taking an image of the region of the stored goods carrier;
d. storing, processing and evaluating the image.

8. The method according to claim 7, wherein the image recording unit records images by an unvarying focus or has an unvarying orientation for taking the image.

9. The method according to claim 7, wherein the image evaluation device crops the recorded image of the region in such a way that at least one depositing region is shown in the recorded image.

10. The method according to claim 9, wherein the image evaluation device determines a complete image of the stored goods carrier by combining a plurality of pictures of the depositing regions.

11. The method according to claim 10, wherein an unoccupied depositing region on the stored goods carrier is visually marked in the complete image of the stored goods carrier.

12. The method according to claim 7, wherein stored goods in the depositing region are identified by image recognition and information on the stored goods is displayed on a display unit.

13. The method according to claim 12, wherein inventory records are automatically prepared or updated subsequent to the loading and/or retrieval of stored goods.

\* \* \* \* \*